United States Patent
Cooke

[15] 3,667,560
[45] June 6, 1972

[54] WEIGHING APPARATUS
[72] Inventor: Geoffrey Cyril Cooke, Stourbridge, England
[73] Assignee: W. & T. Avery Limited, Birmingham, England
[22] Filed: Feb. 27, 1970
[21] Appl. No.: 14,942

[30] Foreign Application Priority Data

Mar. 7, 1969 Great Britain......................12,090/69

[52] U.S. Cl. ...........................177/211, 177/229, 177/DIG. 9
[51] Int. Cl. .......................................................G01g 3/14
[58] Field of Search......................177/211, 229, 255, DIG. 9

[56] References Cited

UNITED STATES PATENTS 2,969,228  1/1961  Appius.....................................177/229
2,598,812  6/1952  Marco et al..............................177/211

FOREIGN PATENTS OR APPLICATIONS 859,630  1/1961  Great Britain..........................177/211

Primary Examiner—Richard B. Wilkinson
Assistant Examiner—George H. Miller, Jr.
Attorney—Norris & Bateman

[57] ABSTRACT

Load measuring apparatus, e.g. self-indicating weigher, having a parallelogramic link system which includes three flexure strips, forming top and bottom linkages connecting a frame member and a moveable load receiving member. Two of the strips are spaced apart horizontally to form one linkage, which may be the top one; and the other strip, which mounts a plurality of strain gauges responsive to flexure thereof to provide a measure of the applied load, forms the other linkage, e.g. the bottom one.

16 Claims, 1 Drawing Figure

PATENTED JUN 6 1972
3,667,560
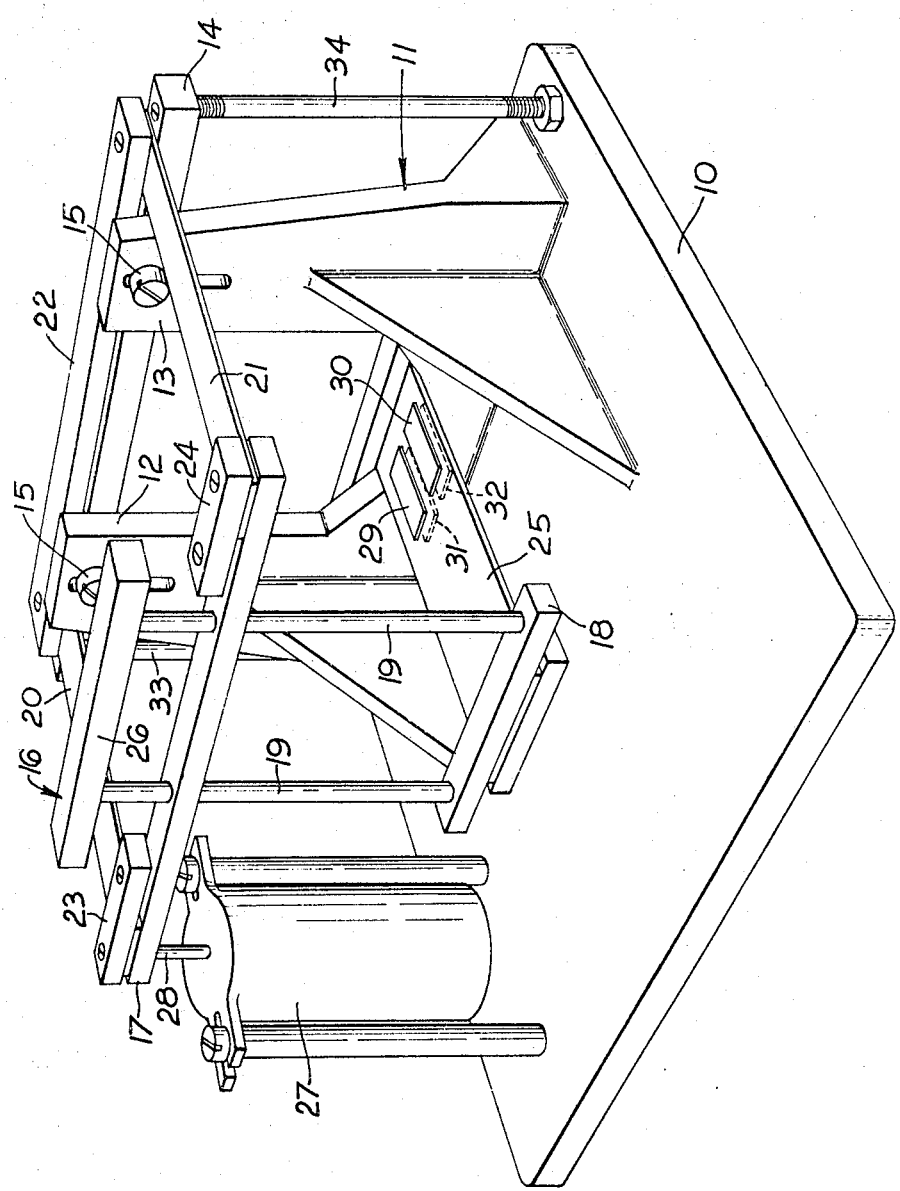
Inventor
GEOFFREY CYRIL COOKE
Attorneys
Norris & Bateman

WEIGHING APPARATUS

This invention relates to load measuring apparatus, and particularly but not exclusively to self-indicating and/or price computing weighing apparatus, for example counter scales for use in shops.

The object of the invention is to provide a load measuring apparatus of simple and sturdy construction, having few moving parts, and which is accurate and speedy in operation.

According to the invention a load measuring apparatus comprises a parallelogramic link system including an upright frame member, an upright load receiving member parallel to but spaced from the frame member, and a plurality of parallel flexure strips forming a top linkage and a bottom linkage connecting the frame member and load receiving member for movement of the latter in a substantially vertical path; and a plurality of strain gauges mounted on the flexure strips to furnish electrical signals representative of a load producing deflection of the flexure strips; characterized in that the flexure strips are three in number of which first 20 and second 21 strips are in spaced, parallel, horizontal coplanar relationship to form one of the linkages and the third flexure strip 25 is spaced vertically from said pair to form the other linkage, and in that all the strain gauges 29, 30, 31, 32 are mounted on said third flexure strip.

A preferred embodiment of the invention is now described with reference to the accompanying drawing which is a perspective view of a linkage mechanism for a price computing weighing scale.

Referring to the drawing, a base 10 has an upright U-shaped frame member 11 integral therewith, the top portions of upright limbs 12 and 13 of said member rigidly mounting a horizontal mounting bar 14 by means of screw 15 which are engaged in vertical slots in said limbs permitting adjustment as described below.

A load receiving member 16, including upper and lower cross bars 17, 18 rigidly connected by vertical rods 19, is connected to frame member 11 to form a parallelogramic linkage by means of three flexure strips. A first and second of said strips, 20, 21 from a top linkage, one end portion of each said strip being rigidly clamped to a respective end portion of mounting bar 14, which portions extend outside the limbs 12, 13 of upright frame member 11, by means of a clamping strip 22. The other end portions of said pair of flexure strips 20, 21 are clamped in like manner by respective clamp blocks 23 and 24 to outer end portions of cross bar 17 so that said pair of strips are spaced horizontally from each other in parallel and co-planar relationship.

A bottom linkage consists of the third flexure strip 25 whose end portions are clamped to a center portion of cross bar 18 of the load receiving member 16 and to a horizontal face on frame member 11 located centrally between the limbs 12 and 13 and spaced vertically below mounting bar 14. The stiffness of third flexure 25 is equal to the sum of the stiffness of the pair of flexures 20 and 21.

Rods 19 of load receiving member 16 are extended upwards to mount a cross member 26 on which a goods platform or pan (not shown) is operatively supported. When a load is applied to said load receiving member the latter will be moved downwards in a substantially vertical path causing deflection of the three flexure strips which act as a resistant. A conventional dash-pot 27 is mounted on base 10 and has a piston rod 28 connected to cross bar 17 to damp oscillation of the linkage system.

Two upper strain gauges 29 and 30 are bonded to the upper surface of third flexure 25 and two lower strain gauges 31 and 32 are bonded to the undersurface of the flexure opposite to the upper gauges, to the part thereof which is clamped to frame member 11. On deflection of the flexure strips under an applied load the upper strain gauges 29, 30 are in tension and the lower strain gauges 31, 32 are in compression. The four gauges are electrically connected in a conventional Wheatstone's Bridge arrangement forming part of a read-out circuit (not shown) so as to provide an electrical output which is substantially linearly proportional to the amount of deflection of the flexure strip under applied loads due to constant bridge impedance. The read-out circuit also includes an electrical filter and integrating system of known design, which in this embodiment is coupled to a price computing and indicating device (not shown).

Screwed adjusting rods 33 and 34 extend between base 10 and the outer ends of mounting bar 14, enabling one or both ends of said bar (to which flexure strips 20 and 21 are clamped) to be finely raised or lowered when screws 15 are slackened. This adjustment provides a simple means of reducing sensitivity of the scale to loads applied off-center with respect to the load receiving member 16 so that maximum accuracy can be provided depending on the type of scale pan and other construction employed.

The use of three flexure strips in a triangular arrangement provide torsional stiffness in the assembled linkage ensuring quick response and so enabling high speed weighing.

Bonding all the strain gauges to a single flexure facilitates production of the scale as the third flexure and the four strain gauges with the electrical connections therebetween can be assembled and bonded as a single unit in a dry environment and sealed with a moisture proofing compound prior to assembly of the apparatus. Moreover with the gauges mounted together on a single flexure, ensures optimum performance since all the gauges suffer similar temperature and other ambient conditions.

What is claimed is:

1. A load measuring apparatus comprising a parallelogramic link system including an upright frame member, an upright load receiving member parallel to but spaced from the frame member, and a plurality of parallel flexure strips forming a top linkage and a bottom linkage connecting the frame member and load receiving member for movement of the latter in a substantially vertical path; and a plurality of strain gauges mounted on the flexure strips to furnish electrical signals representative of a load producing deflection of the flexure strips; characterized in that the flexure strips are three in number of which first (20) and second (21) strips are in spaced, parallel horizontal co-planar relationship to form one of the linkages and the third flexure strip (25) is spaced vertically from said pair to form the other linkage, and in that all the strain gauges (29, 30, 31, 32) are mounted on said third flexure strip.

2. A load measuring apparatus according to claim 1 characterized in that the resistance to deflection of the flexure strips (20, 21, 25) constitutes the whole of load measuring resistance of the apparatus and the resistance of the third strip (25) equals the sum of the resistances of the first and second strips (20, 21).

3. A load measuring apparatus according to claim 1 characterized in that the pair of first and second flexure strips (21, 22) constitute the top linkage and the third flexure strip (25) constitutes the bottom linkage.

4. A load measuring apparatus according to claim 1 characterized by a dash-pot (27) connected between relatively movable parts of the load-receiving member (16) and a frame structure (10) of the apparatus including the frame member.

5. A load measuring apparatus as defined in claim 1, wherein each of said flexure strips is fixed at one end to said frame member and at the opposite end to said load receiving member.

6. A load measuring apparatus according to claim 1, characterized in that there are four strain gauges (29, 30, 31, 32) mounted two (29, 30) on an upper surface and two (31, 32) on a lower surface of said third flexure strip (25) immediately beneath the upper two gauges.

7. A load measuring apparatus according to claim 6 characterized in that the strain gauges, (29, 30, 31, 32) are mounted by bonding and are electrically interconnected, said bonded gauges and electrical inter-connections being sealed with a moisture proofing compound.

8. A load measuring apparatus according to claim 6 characterized in that the four strain gauges (29, 30, 31, 32) are electrically interconnected in a Wheatstone's Bridge arrangement for furnishing said electrical signals.

9. A load measuring apparatus comprising a parallelogramic link including an upright frame member, an upright load receiving member parallel to but spaced from the frame member, and a plurality of parallel flexure strips forming a top linkage and a bottom linkage connecting the frame member and load receiving member for movement of the latter in a substantially vertical path, said flexure strips being three in number of which first and second strips are in spaced parallel horizontal co-planar relationship to form a first of said linkages and the third strip is spaced vertically from said pair to form a second of said linkages, means for adjusting the position of attachment to said frame member of one of the linkages relative to the position of attachment of the other linkage, and a plurality of strain gauges all mounted on said third flexure strip to furnish electrical signals representative of the magnitude of a load applied to said load receiving member and causing deflection of said strips.

10. A load measuring apparatus according to claim 9 wherein said one linkage is said first linkage and the adjustment means is operable to adjust the position of attachment of each of said first and second flexure strips independently of the other.

11. A load measuring apparatus according to claim 9 wherein the resistance to deflection of said three flexure strips constitutes the whole load measuring resistant of the apparatus and the resistance of said third strip equals the sum of the resistances of said first and second strips.

12. A load measuring apparatus according to claim 9 wherein said first linkage constituted by the pair of first and second flexure strips in the top linkage, and said second linkage constituted by the third flexure strip in the bottom linkage.

13. A load measuring apparatus according to claim 9 including a dash-pot connected between relatively movable parts of the load-receiving member and a frame structure of the apparatus including the frame member.

14. A load measuring apparatus according to claim 9 having four strain gauges mounted two on an upper surface of said third flexure strip and two on a lower surface thereof immediately beneath the upper two gauges.

15. A load measuring apparatus according to claim 14 wherein the strain gauges are mounted by bonding and are electrically interconnected, said bonded gauges and electrical interconnections being sealed with a moisture proofing compound.

16. A load measuring apparatus according to claim 14 wherein the four strain gauges are electrically interconnected in a Wheatstone's Bridge arrangement for furnishing said electrical signals.

* * * * *